(12) United States Patent
Theoharis et al.

(10) Patent No.: US 12,254,521 B2
(45) Date of Patent: *Mar. 18, 2025

(54) SECURE SERVICE RECIPIENT ONLINE PORTAL

(71) Applicant: ABC Legal Services, LLC, Seattle, WA (US)

(72) Inventors: Alexander J L Theoharis, Seattle, WA (US); Timothy D. Dinehart, Seattle, WA (US); Diane I. Conrad, Seattle, WA (US); Daniel Beier, Seattle, WA (US); Brandon H. Fuller, Seattle, WA (US); James J. MacLeod, Seattle, WA (US); Emily A. Barnard, Seattle, WA (US); David Thorn, Seattle, WA (US); Akshitha Vaddi, Seattle, WA (US); Aaron Cushman, Fairview, NC (US)

(73) Assignee: ABC Legal Services, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/732,346

(22) Filed: Jun. 3, 2024

(65) Prior Publication Data
US 2024/0370953 A1 Nov. 7, 2024

Related U.S. Application Data

(63) Continuation of application No. 18/444,538, filed on Feb. 16, 2024, which is a continuation of application No. 18/164,429, filed on Feb. 3, 2023, now Pat. No. 11,908,027.

(51) Int. Cl.
*G06Q 50/18* (2012.01)
*G06Q 10/083* (2024.01)

(52) U.S. Cl.
CPC .......... *G06Q 50/18* (2013.01); *G06Q 10/083* (2013.01)

(58) Field of Classification Search
None
See application file for complete search history.

(56) References Cited

U.S. PATENT DOCUMENTS

| 7,162,428 B1 | 1/2007 | Rosenthal et al. |
| 2011/0125656 A1 | 5/2011 | Kingery |
| 2013/0334300 A1 | 12/2013 | Evans |

(Continued)

FOREIGN PATENT DOCUMENTS

WO 2019228549 A2 12/2019

OTHER PUBLICATIONS

"Introducing Electronic Service of Process with ServeManager" Available at URL https://www.servemanager.com/blog/2931/electronic-service-of-process Jun. 29, 2020, 3 Pages.

*Primary Examiner* — Jan P Mincarelli
(74) *Attorney, Agent, or Firm* — AEON Law, PLLC; Adam L. K. Philipp; Charlotte E. Holoubek

(57) ABSTRACT

Methods and systems that allow a process service recipient to electronically receive documents include receiving personally identifiable information about the recipient, generating a retrieval code specific to the recipient and/or the documents, and causing the retrieval code to be displayed on a page or device for delivery to the recipient. Later, the methods and systems receive user input including the retrieval code, verify that the user is the recipient, and provide the recipient access to the electronic documents.

20 Claims, 7 Drawing Sheets

(56) References Cited

U.S. PATENT DOCUMENTS

2017/0357941 A1* 12/2017 Best .................. G06Q 10/10
2020/0356697 A1   11/2020 Brannon et al.
2021/0049716 A1    2/2021 Li
2021/0142607 A1    5/2021 Mossoba et al.

* cited by examiner

Please review the Notice and Acknowledgment of Receipt below.

Once you are ready, electronically sign the document.

Signed

A copy of the form will be emailed to the email address you provided.

*Fig. 5*

SECURE SERVICE RECIPIENT ONLINE PORTAL

CROSS-REFERENCE TO RELATED CASES

This application is a continuation of U.S. non-provisional patent application Ser. No. 18/444,538, filed Feb. 16, 2024, titled "SECURE SERVICE RECIPIENT ONLINE PORTAL", which is a continuation of U.S. non-provisional patent application Ser. No. 18/164,429, filed Feb. 3, 2023, titled "DIGITAL DELIVERY OF LEGAL PROCESS", now U.S. Pat. No. 11,908,027 issued Feb. 20, 2024. The entire contents of the above-referenced applications and of all priority documents referenced in the Application Data Sheet filed herewith are hereby incorporated by reference for all purposes.

FIELD

This disclosure is directed to improved systems and methods of service of process.

BACKGROUND

The service of process field has not changed much in two hundred years. Proper service of documents giving notice of a claim is a key step in getting a legal case started. Generally, to be valid, service must be in person, and the server must provide proof that the documents were served to the correct recipient. For proof of service in California, a party recipient may also make a written admission; but that is rarely if ever done, because when process is served in person, the process server can provide proof of service as usual.

Attempts to serve process without in-person delivery—for example, taping documents to someone's door (or sliding them underneath), dropping them in the someone's mailbox, or sending them by mail—may not satisfy a court that the intended recipient has received proper service of process. The same goes for sending documents by email. Courts and experienced litigators are used to the truism that "email service is invalid."

BRIEF DESCRIPTION OF THE DRAWINGS

Some embodiments of the disclosed technology are described below with reference to the following accompanying drawings.

FIG. 5 illustrates an acknowledgment presentation page in accordance with one embodiment.

DETAILED DESCRIPTION

Figure 1:
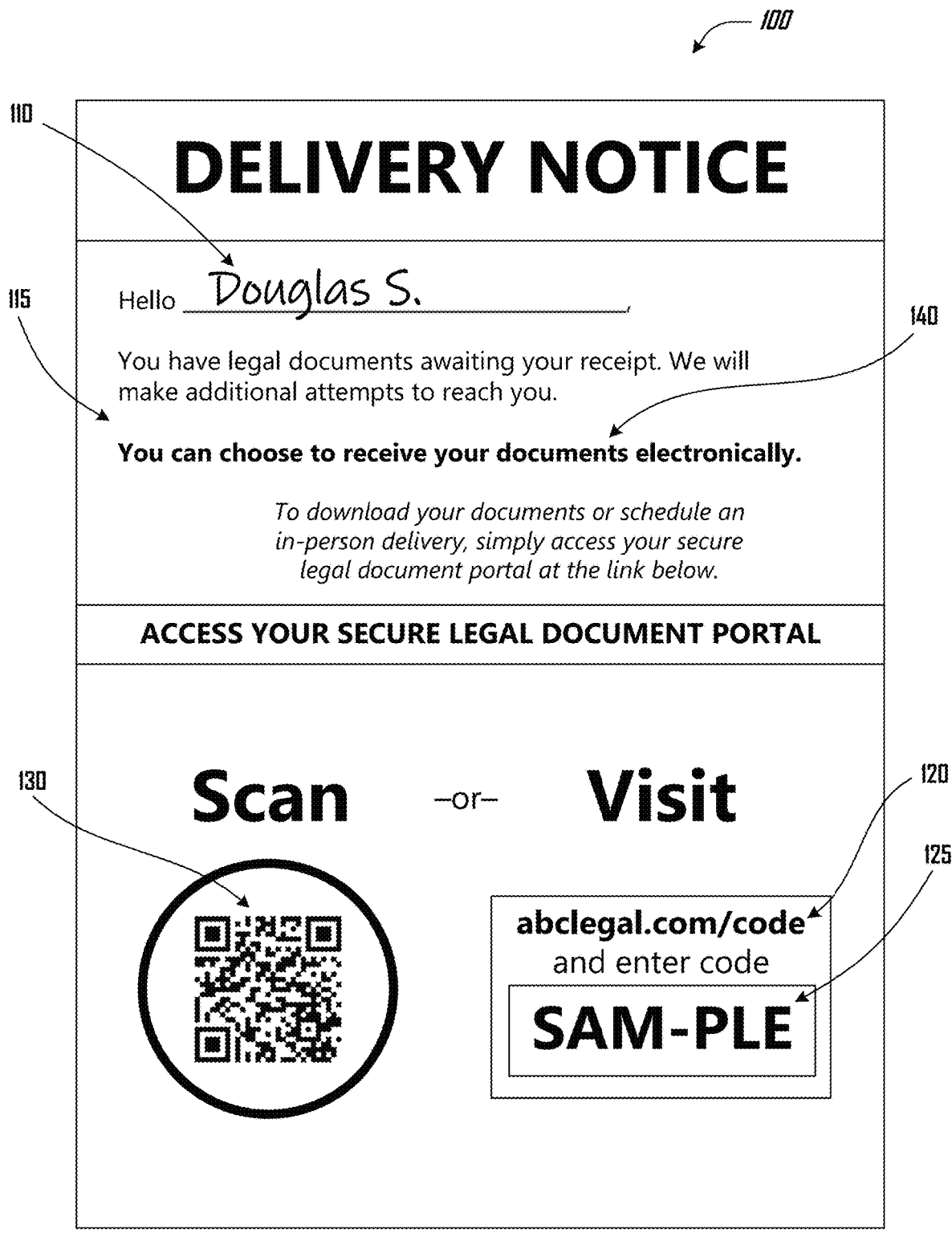
FIG. 1 illustrates a delivery notice in accordance with one embodiment.

This application discloses improved systems and methods of service of process by allowing recipients to electronically receive documents and electronically acknowledge their receipt to complete service of process. In various embodiments, the systems and methods provide the documents in electronic form in full before obtaining acceptance of service. In some embodiments, the acknowledgment of receipt includes obtaining either an acceptance of service of process for the documents or a waiver of service of process for the documents.

The disclosed technology allows a service recipient to proactively accept service of their documents electronically. In some embodiments, the technology includes providing the service recipient a link to a secure legal document portal. The link may be provided to the service recipient physically (e.g., in a delivery notice such as an ABC Legal Attempt Tag™) or electronically (e.g., in an electronic message or via an electronic device). The link does not need to be formally served. The service recipient can follow the link to the secure legal document portal at a time of their choosing, regardless of how easy or difficult it might be for a traditional process server to effect service of process on the service recipient. In this way, the technology adds steps that can ultimately make service of process more efficient and less resource intensive.

In various embodiments, obtaining acceptance of service of process includes confirming the service recipient's identity, presenting electronic copies of the documents to be delivered (e.g., via the secure legal document portal), and obtaining the service recipient's assent to deliver the documents electronically (e.g., to an email address or as a file download). The technology further includes delivering the documents electronically, presenting a statement acknowledging or waiving service, and obtaining the service recipient's digital signature of the statement.

After the technology is used to obtain the service recipient's digital signature of the statement, the documents have been delivered and there is no need to attempt to physically serve papers on the service recipient. Thus, the technology produces a signed acceptance or waiver of service that may be filed with the relevant court together with a corresponding proof of service.

In comparison to traditional approaches to serve process, the disclosed technology provides several advantages. It allows improved control of process server/defendant interactions, improves service rates, reduces average time to service, and protects recipient privacy. In addition, if the service recipient provides their assent and completes the process, the disclosed technology allows the service recipient to obtain documents in convenient electronic format (e.g., digital documents having searchable text that are easy to manage, share with an attorney, etc.). The added features of the disclosed technology enhance traditional service of process by allowing service recipients to consent to electronic document delivery and avoid the inconveniences of traditional service, while keeping traditional service as the default if the service does not consent to electronic delivery according to the disclosed technology.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional user interface elements may be added, and illustrated elements may be combined, changed, and/or removed, without limiting the scope to the embodiments disclosed herein. Each of the Figures discussed below may include many more or fewer components than those shown and described. Moreover, not all of the described components may be required to practice various embodiments, and variations in the arrangements and types of the components may be made. However, the components shown are sufficient to disclose various illustrative embodiments for practicing the disclosed technology.

While this disclosure generally refers to electronic service of process and electronic documents, other terms may be equally applicable in various contexts. Such substitutable or equivalent terms include digital (meaning electronic as disclosed herein); legal process, process service, document delivery, e-delivery or eDelivery™ (meaning service of process as disclosed herein); an Attempt Tag™ (meaning a delivery notice as disclosed herein); and a service packet or papers (meaning documents for which service of process may be accepted as disclosed herein).

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. For example, "a document" generally includes multiple documents, and "documents" includes a single document. It should also be noted that the term "or" is generally employed in its sense including "and/or" unless the content clearly dictates otherwise.

The disclosed systems and methods of digital delivery of legal process can take a variety of form factors. FIGS. 1 through 7 illustrate a variety of different arrangements, designs, and subsystem possibilities. The illustrated systems and methods are not an exhaustive list; in other embodiments, a system or method of accepting electronic service of process according to this disclosure could be formed in different arrangements. However, it is not necessary to exhaustively show such optional implementation details to describe illustrative embodiments.

FIG. 1 illustrates a delivery notice 100 for digital delivery of legal process to a recipient 110 in accordance with one embodiment. A delivery notice 100 may also be referred to as an Attempt Tag™, because it can be left at an address associated with an intended recipient, representing an attempt to reach the recipient for service of process. Unlike traditional in-person service of process, a delivery notice 100 is configured to be left for or otherwise provided or sent to the service recipient 110 without verified in-person delivery and without requiring proof of service.

The example delivery notice 100 includes a name of the recipient 110. The delivery notice 100 may include other personally identifying information instead of or in addition to the name of the recipient 110. In the illustrated example, the name of the recipient 110 on the delivery notice 100 includes a first name and last initial, an arrangement that indicates to the recipient 110 that the delivery notice 100 is directed to them but minimizes display of personal information of the recipient 110. In some embodiments, the delivery notice 100 is configured to conceal personal information of the recipient 110 (e.g., with a field hidden by an overlying page or a fold, facing inward or away from an outside viewer, or otherwise not outwardly displayed) to maintain privacy of the recipient 110.

The example delivery notice 100 also includes instructions 115 that inform the recipient 110 that legal documents 140 are available, that a process server will make additional attempts to physically deliver the legal documents 140 to the recipient 110 (and that the recipient 110 may schedule in-person delivery for mutual convenience), and that as a novel alternative to traditional service of process, electronic delivery is available via a secure legal document portal.

The example delivery notice 100 further includes a link 120 to a website where the recipient 110 may access the secure legal document portal, and a retrieval code 125 for the recipient 110 to obtain the documents 140 via the secure legal document portal. In the illustrated example, the link 120 is a short, general URL ("abclegal.com/code") that is not specific to the recipient 110 or the documents 140, and the retrieval code 125 is a customized code (e.g., an alphabetic or alphanumeric code, which may include symbols or special characters in addition to Latin letters and/or Arabic digits, and/or may exclude characters that might be confused with one another) that is specific to the recipient 110 and/or to the documents 140. In other embodiments of the disclosed technology, the link 120 is specific to the recipient 110 and/or to the documents 140, and the retrieval code 125 is not required for the recipient 110 to access the secure legal document portal and obtain the documents 140. In various embodiments, the disclosed systems and methods generate each retrieval code 125 such that each retrieval code 125 is unique among outstanding retrieval codes 125. In some embodiments, multiple retrieval codes 125 may refer to one secure legal document portal. That allows an individual delivery notice 100 to be distinguished from other delivery notices 100, so that if delivery notices 100 are sent to different addresses, the use of a specific retrieval code 125 can identify the associated address as a location where the service recipient 110 may successfully be reached.

The example delivery notice 100 further includes a machine-readable code 130 that the recipient 110 may scan to access the secure legal document portal and obtain the documents 140. In various embodiments, the machine-readable code 130 may include one or more of a linear bar code, a QR code, a GS1 DataMatrix, color code, or another 2D code; an RFID tag or RF tag, NFC tag, Bluetooth beacon, IR code, or other radio frequency tag; etc. In the illustrated example delivery notice 100, the machine-readable code 130 is a custom-printed QR code that directs to a personalized page for the recipient's specific order. The example QR code encodes or embeds a URL ("abclegal.com/code/SAMPLE") that is specific to the recipient 110 and/or the documents 140; in this example, it incorporates both the link 120 and the retrieval code 125. Accordingly, the illustrated machine-readable code 130 may be scanned (e.g., by a QR code reader, mobile phone camera, etc.) to read the embedded URL and send it to a web browser. Thus, the disclosed technology allows the recipient 110 to directly access the secure legal document portal to obtain the documents 140.

In some embodiments, the delivery notice 100 is a printed paper form, such as a note or door tag with an adhesive backing. Such a delivery notice 100 may be left at a physical address where the recipient should encounter it, or it can be provided in person to the recipient 110. In various embodiments, an agent for service of process leaves the delivery notice 100 at the recipient's address when the recipient 110 is not available to receive documents (e.g., during or after a traditional attempt to serve process). A person who is not qualified as an agent for service of process may take the delivery notice 100 to an address for the recipient 110, broadening the delivery pool and reducing the cost of delivery. Moreover, delivery of the delivery notice 100 may be effected by postal mail, package delivery service, or other standard delivery options, because the delivery notice 100 is not subject to traditional service of process and proof of service requirements.

In some embodiments, the delivery notice 100 is an electronic document, such as an Adobe® PDF file, an image file (e.g., TIFF, GIF, JPEG, WEBP, etc.), an XHTML document, a word processing application document, a web page, an email message, an instant messaging application message, a text message, or the like. In such embodiments, the delivery notice 100 may be provided or sent electronically to the recipient 110 (e.g., as an email message, a message via another messaging platform, a file download, etc.). In some embodiments, an electronic delivery notice 100 is presented via an electronic device (e.g., a mobile phone, tablet, e-ink display, IoT appliance, computer, TV, etc.) that may be provided to the service recipient 110.

Implementing the disclosed delivery notice 100 provides advantageous improvements to traditional service of process. For example, by directing service recipients 110 to a secure legal document portal, it centralizes communication from the field, allowing a process service company to quickly, accurately, and successfully record, retain, and manage incoming data regarding each pending document service, such as reports of preferred times for delivery, new service addresses, and confirmation of residency. The secure legal document portal can log all interactions stemming from a delivery notice 100, allowing analysis of the viability of each address associated with a deliver notice 100.

The following figures illustrate additional elements associated with digital delivery of legal process that can be initiated with the delivery notice 100. In some instances, the delivery notice 100 may be omitted. For example, the disclosed technology includes configuring an electronic device to obtain identity confirmation from the recipient 110 and proceed to provide electronic documents and obtain acceptance of delivery as disclosed herein. In such an implementation, it may be unnecessary to initiate service of process with a delivery notice 100. Such implementations are within the scope of the disclosed technology. The present disclosure encompasses various arrangements and layouts of steps and elements of digital delivery of legal process, and is not limited to the embodiment described via this illustrative example.

Figure 2A:
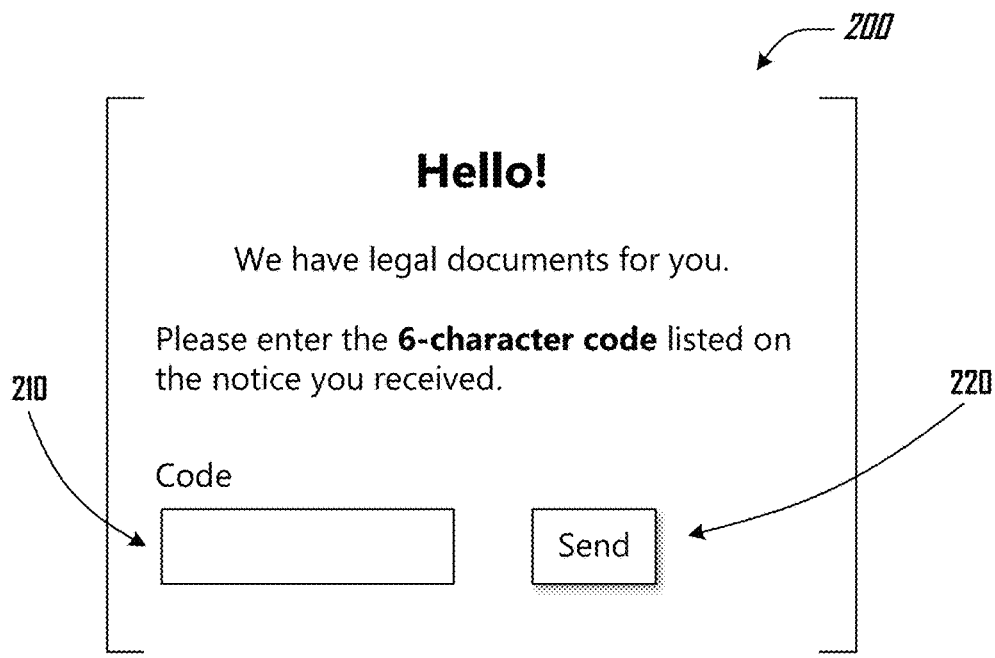
FIG. 2A illustrates a matter identification code dialog in accordance with one embodiment.

FIG. 2A illustrates an example user interface of a digital delivery of legal process system showing a matter identification code dialog 200 in accordance with one embodiment. The matter identification code dialog includes a matter identification code field 210 configured to receive a matter identification code, such as the retrieval code 125 printed (or otherwise displayed) on the delivery notice 100 illustrated in FIG. 1. In the illustrated example, the disclosed systems and methods allow a user (not yet verified as the intended recipient 110) to enter a code in the matter identification code field 210 and to transmit the entered matter identification code via the send button 220. If the entered matter identification code corresponds to an outstanding retrieval code 125 for an uncompleted service of process, the systems and methods direct the user to the secure legal document portal for that matter.

In some embodiments of the disclosed systems and methods, a user skips the matter identification code dialog 200 by scanning the machine-readable code 130 that includes or encodes the retrieval code 125, or by navigating to a URL that includes or encodes the retrieval code 125.

Figure 2B:
FIG. 2B illustrates a personal identification data dialog in accordance with one embodiment.

FIG. 2B illustrates an example user interface of a digital delivery of legal process system showing a personal identification data dialog 250 in accordance with one embodiment. The personal identification data dialog 250 is addressed 260 to the name of the service recipient 110, providing confirmation to the recipient 110 that they are at the desired secure legal document portal for their matter.

To provide assurance that only the intended recipient retrieves the documents through the secure legal document portal, the disclosed systems and methods confirm the user's identity. Personally identifiable information (PII) about the intended service recipient 110 is not revealed, and the documents 140 to be served are not provided to the user, until the user's identity as the service recipient 110 is confirmed. Accordingly, the disclosed systems and methods provide protection against accidental disclosure of a debt-related communication to someone who is unable to confirm their identity as the intended recipient 110.

If the user is not the recipient 110, the user can follow an exit link 265 to abort the verification and cancel document delivery and electronic acceptance. In some embodiments, if the user is not the recipient 110, the system allows the user to submit an address of the recipient.

In the illustrated example, the personal identification data dialog 250 includes a personal identification data field 270 configured to receive personal identification data. The disclosed systems and methods allow a user (not yet verified as the intended recipient 110) to enter the requested personal identification data in the personal identification data field 270 and to transmit the entered personal identification data via the confirm identity button 280. In the illustrated example, the systems and methods use a social security number (SSN) check to verify the user's identity as the recipient 110. Other types of verification data and other forms of identity verification (e.g., as described in additional detail below with reference to FIG. 6) are contemplated and are within the scope of the present disclosure. In addition to SSN verification (and a digital signature as described in additional detail below with reference to FIG. 5), the systems and methods may log information about the recipient's visit in detail to provide a digital fingerprint and/or a record of the recipient's interactions with the secure legal document portal regarding the documents 140.

Figure 3:
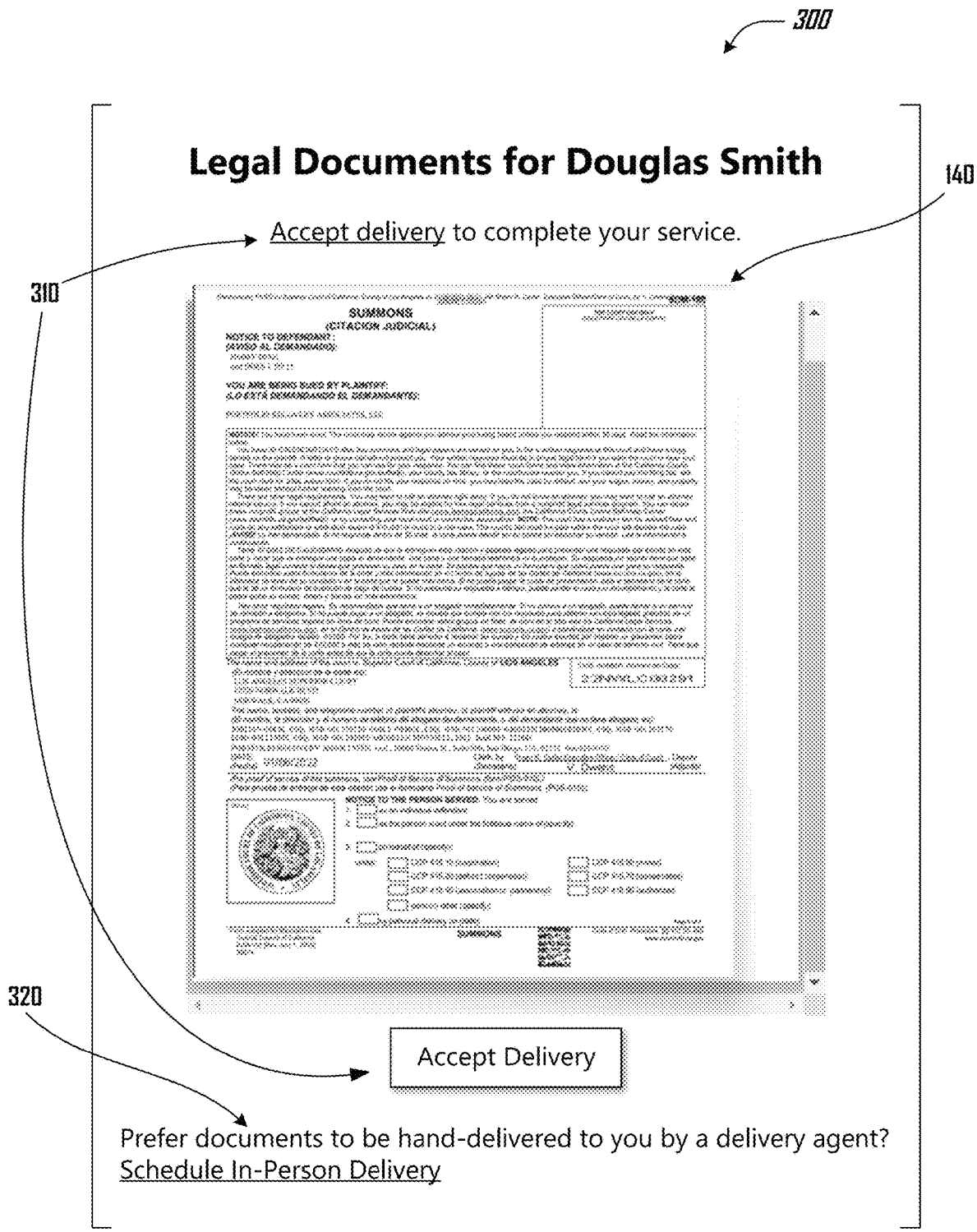
FIG. 3 illustrates a secure legal document portal page in accordance with one embodiment.

FIG. 3 illustrates an example user interface of a digital delivery of legal process system showing a secure legal document portal page 300. The illustrated secure legal document portal page 300 presents documents 140 to the service recipient 110 and offers an option to accept delivery 310 in accordance with one embodiment. In the illustrated embodiment, the secure legal document portal page 300 offers the option to accept delivery 310 in two places. In various embodiments, the secure legal document portal page 300 explicitly invites the recipient 110 to accept electronic delivery of the documents 140 as electronic documents 140. The secure legal document portal provides a control center for the service recipient to direct service of process, allowing the process to be more transparent to all parties, more efficient, and more convenient.

As an alternative, the secure legal document portal page 300 gives the recipient 110 an option to schedule in-person delivery 320 of the documents 140. In some embodiments, when a recipient 110 takes the option to schedule in-person delivery 320 of the documents 140, the systems and methods also cancel electronic document delivery and electronic acceptance.

With their identity confirmed, the recipient 110 can view an electronic version of the service packet documents 140. The disclosed technology allows the intended service recipient 110 to request an in-person delivery of the documents 140 at a scheduled time, to update their address, and/or to elect to have their documents delivered electronically and to accept that electronic delivery as satisfying or completing the service of process. These 21st Century options are novel, unconventional technological improvements that were never before available to providers or recipients of traditional attempts to serve process.

Figure 4:
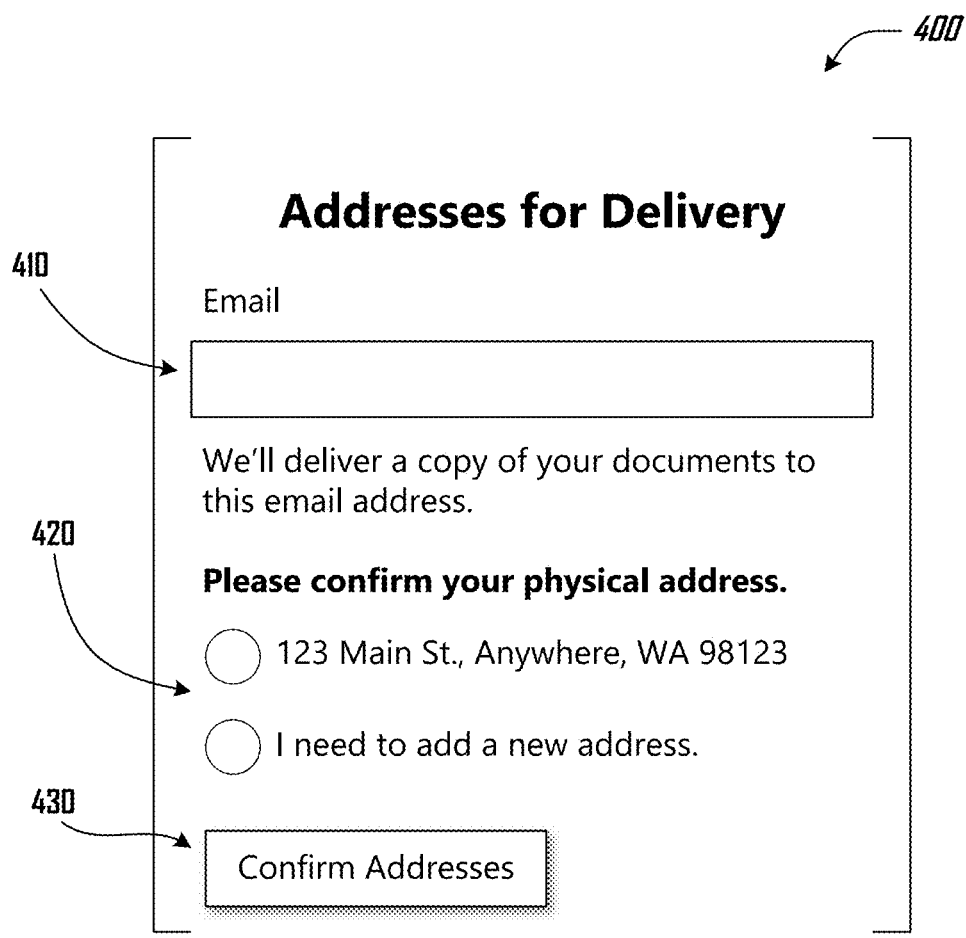
FIG. 4 illustrates an address confirmation dialog in accordance with one embodiment.

FIG. 4 illustrates an example user interface of a digital delivery of legal process system showing an address confirmation dialog 400 in accordance with one embodiment. In response to the recipient 110 accepting electronic delivery of the documents 140, the illustrated example presents an email address field 410, for the recipient 110 to enter an email address where the recipient 110 would like to receive digital delivery of the electronic documents 140. In various embodiments, the systems and methods save the provided email address and associate it with the recipient 110 as a confirmed address to contact the recipient 110.

In addition to or in the alternative to the email address field 410, the address confirmation dialog 400 includes confirmation radio buttons 420 that allow the recipient 110 to confirm a physical address for physical delivery of hard copies of the documents 140, or to indicate that the recipient 110 wishes to add (or, e.g., modify) an address for physical delivery.

An address confirmation button 430 allows the recipient 110 to confirm the entered and/or selected addresses for electronic and/or physical service of process of the documents 140. In various embodiments, when the recipient 110 enters (and, e.g., confirms) their email address for delivery of the documents 140, the disclosed systems and methods dispatch the complete service packet of documents 140 to the recipient 110 via email for their records. The systems and methods automatically log the transmission details (and, e.g., monitor and verify that no "bounce" or undeliverable email message is received in response to the transmission).

In some embodiments, when the recipient 110 provides an updated physical address, the systems and methods determine whether the updated address of the recipient 110 is in a venue or jurisdiction associated with the electronic documents 140. In some embodiments, f the updated address of the recipient 110 is not in the venue or jurisdiction associated with the electronic documents 140, the systems and methods cancel delivery of any electronic documents 140 that relate to a different venue or jurisdiction.

FIG. 5 illustrates an example user interface of a digital delivery of legal process system showing an acknowledgment presentation page 500. The acknowledgment presentation page 500 presents an acknowledgment of receipt 510 form that is configured with a signature block 520 for a digital signature of the recipient 110 in accordance with one embodiment.

In some embodiments, the acknowledgment of receipt 510 is an acceptance document or form that is configured in accordance with local law, state-approved (or -mandated), or court-approved (or -mandated) for a service recipient 110 to acknowledge and accept (or waive) the service of process of the documents 140. For example, the illustrated acknowledgment of receipt 510, titled "Notice and Acknowledgment of Receipt-Civil," is based on form POS-015 adopted by the Judicial council of California. That form specifically relates to California Code of Civil Procedure §§ 415.30 and 417.10, which provide for mailing a civil summons to a party, and having that party acknowledge receiving the mailed summons.

In the illustrated example, the disclosed systems and methods are configured to allow the recipient 110 to electronically sign the illustrated acknowledgment of receipt 510 to accept service, even outside the scope of those limited California provisions. For example, the disclosed systems and methods allow electronic delivery of documents 140, which is not permissible or contemplated under California law. As another example, the California form does not provide for an electronic signature 520. Thus, the disclosed systems and methods are designed to take advantage of a form that some courts may have previously seen in a different context, as a way to take advantage of judicial familiarity and obtain favorable treatment of the present technology for digital delivery of legal process.

In the illustrated embodiment, the acknowledgment presentation page 500 includes a digital signature block 520 and a signed button 530, so that the recipient 110 may sign the acknowledgment of receipt 510 via the digital signature block 520 and then indicate by the signed button 530 that they have executed the acknowledgment of receipt 510, acknowledging and accepting the service. In some embodiments, the digital signature block 520 includes a field in which the recipient 110 can make any mark signifying their intent to sign the acknowledgment of receipt 510. Such a mark may include, for example, typed text characters, mouse movements and/or clicking input, an image, a drawn signature, etc. In some embodiments, the digital signature block 520 includes a facility allowing the recipient 110 to provide a cryptographically verifiable digital signature.

When the recipient 110 has signed for delivery, acknowledging and accepting the service, the systems and methods save the executed acknowledgment of receipt 510 (including, e.g., any metadata regarding execution by the recipient 110, such as an audit trail of the signing process). An entity using the present technology to obtain acceptance of digital delivery of legal process may then file the recipient's signed acknowledgement of receipt 510 with a court, and execute and file a proof of service attestation confirming the accepted electronic service details.

Figure 6:
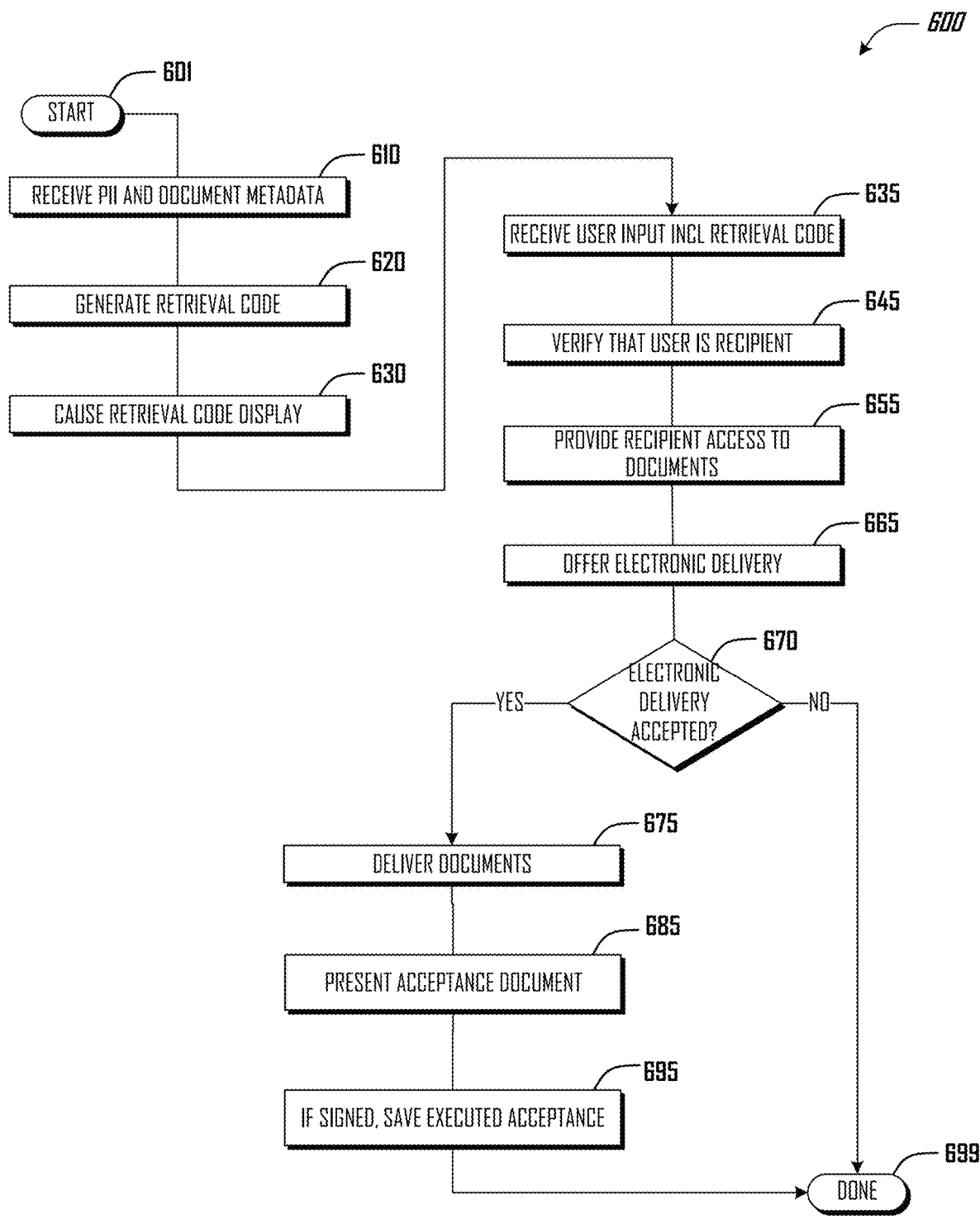
FIG. 6 illustrates an operational routine of a digital delivery of legal process system in accordance with one embodiment.

FIG. 6 illustrates an operational routine 600 of a digital delivery of legal process system in accordance with one embodiment. In various embodiments, the operational routine 600 is performed by one or more computing devices such as those illustrated below with reference to FIG. 7. As those having ordinary skill in the art will recognize, not all events of an operational routine are illustrated in FIG. 6. Rather, for clarity, only those aspects reasonably relevant to describing the electronic acceptance of service of documents are shown and described. Those having ordinary skill in the art will also recognize that the presented embodiment is merely one example embodiment and that variations on the presented embodiment may be made without departing from the scope of the broader inventive concept set forth in the description herein and the claims below. The operational routine 600 begins in starting block 601.

In block 610, the digital delivery of legal process system receives personally identifiable information (PII) about the recipient 110, and metadata about one or more electronic documents 140. PII refers to information that can be used to distinguish or trace an individual's identity, either alone or when combined with other personal or identifying information that is linked or linkable to a specific individual. For example, information that directly identifies an individual includes the person's name, address, social security number or other identifying number or code, telephone number, email address, etc.

In block 620, the digital delivery of legal process system generates a retrieval code. The retrieval code 125 is specific to the recipient 110 and/or specific to the electronic documents 140. An example retrieval code 125 is illustrated and described in additional detail above with reference to FIG. 1.

In block 630, the digital delivery of legal process system causes the retrieval code 125 to be displayed on a page or device for delivery to the recipient 110. In some embodiments, causing the retrieval code 125 to be displayed on a page or device includes printing the retrieval code 125 on a paper configured to be delivered to or left at an address associated with the recipient 110, or sending an electronic message including the retrieval code 125 to an email address, instant messaging address, or text message number or address associated with the recipient 110. An example delivery notice 100 is illustrated and described in additional detail above with reference to FIG. 1.

In block 635, at a later time, the digital delivery of legal process system receives, from a user, input including the retrieval code 125. In some embodiments, receiving a user's input including the retrieval code 125 includes receiving, over a communication network, input of an alphanumeric retrieval code 125 entered by the user, or receiving a request directed to a URL in which the retrieval code 125 is embedded or encoded. In some embodiments, receiving a user's input including the retrieval code 125 further includes logging an interaction indicating, that an address where the delivery notice 100 page or device displaying the retrieval code 125 was delivered is viable to be associated with the recipient 110. An example matter identification code dialog 200 is illustrated and described in additional detail above with reference to FIG. 2A.

In block 645, the digital delivery of legal process system verifies, in response to receiving the input, that the user is the recipient 110. In some embodiments, verifying that the user is the recipient 110 includes causing display of a page specific to the recipient 110 and/or the electronic documents 140 associated with the retrieval code 125. In some embodiments, verifying that the user is the recipient 110 includes confirming that the user can prove their identity with knowledge that corresponds to the PII about the recipient 110 received in block 610. In some embodiments, verifying that the user is the recipient 110 includes recording a digital signature of the user and/or obtaining an email address of the user. An example personal identification data dialog 250 is illustrated and described in additional detail above with reference to FIG. 2B.

In various embodiments, if the verification is not successful, the process of digital delivery of legal process ends in block 699, and the system does not provide the user the PII about the recipient or the electronic documents. On the other hand, if the verification is successful, the system may confirm, for an address where the delivery notice 100 page or device displaying the retrieval code 125 was delivered, that the address is associated with or a residence of the recipient 110; and/or the system may allow the verified user to provide an updated address of the recipient 110. In some embodiments, the system determines whether an updated address of the recipient 110 is in a venue or jurisdiction associated with the electronic documents 140, and if not, the system cancels delivery of the electronic documents 140 and the process of digital delivery of legal process ends in block 699.

In block 655, the digital delivery of legal process system provides the recipient access to the electronic documents 140. The metadata received in block 610 allows the one or more computing devices to retrieve the electronic documents 140 to provide the recipient 110 access to the electronic documents 140. In various embodiments, the digital delivery of legal process system provides a secure legal document portal 300 that allows the recipient 110 to view the documents 140. In some embodiments, the secure legal document portal 300 stores the documents 140 for retrieval. In some embodiments, the secure legal document portal 300 stores references or pointers to the documents 140 to allow the documents 140 to be retrieved from another computing device or computer-readable storage medium. An example secure legal document portal page 300 is illustrated and described in additional detail above with reference to FIG. 3.

In block 665, the digital delivery of legal process system offers to deliver the electronic documents to the recipient 110, such as electronic delivery by email, as a file download, as a link to files stored on a cloud-based file storage system, etc. Having shown the documents to the recipient 110 in block 655, the system requests the service recipient's assent to electronically deliver, send, or provide copies of the documents 140 to the recipient 110. Accordingly, the system may request an email address for transmission of the documents 140, or provide an option for the recipient 110 to download the documents 140 to a computing device of the recipient 110. An example secure legal document portal page 300 is illustrated and described in additional detail above with reference to FIG. 3, and an example address confirmation dialog 400 is illustrated and described in additional detail above with reference to FIG. 4.

In decision block 670, the digital delivery of legal process system determines whether the recipient accepts the offer of electronic delivery of the electronic documents 140 made in block 665. For example, in the example illustrated and described above with reference to FIG. 3, the secure legal document portal page 300 offers (in two places) an option to accept delivery 310. If the recipient 110 takes the option to accept delivery 310, the recipient 110 may give or confirm their assent to receive the documents 140 electronically by, e.g., providing an email address to receive delivery of the documents 140 or by initiating and completing a file download of the documents 140 to a computing device or computer-readable storage medium of the recipient 110.

If the recipient 110 declines the option to receive electronic delivery of the documents 140, the process of digital delivery of legal process ends in block 699. In some embodiments, if the recipient 110 does not agree to the offer to deliver the electronic documents to the recipient 110, the system allows the recipient 110 to schedule a preferred time for physical delivery of physical documents 140 corresponding to the electronic documents 140.

If the recipient 110 accepts the option to receive electronic delivery of the documents 140 (agrees to the offer of electronic delivery), the process of digital delivery of legal process continues in block 675.

In block 675, the digital delivery of legal process system causes the electronic documents 140 to be electronically delivered to the recipient 110. For example, the system delivers the documents 140 to an email address designated or provided by the recipient 110, or allows the recipient 110 to download the documents 140 to a computing device or computer-readable storage medium of the recipient 110. In some embodiments, causing the electronic documents 140 to be electronically delivered to the recipient 110 includes sending the electronic documents 140 to an email address of the recipient 110, and optionally sending physical copies of the electronic documents 140 to a physical address of the recipient 110.

In block 685, after the electronic documents 140 are electronically delivered to the recipient 110, the digital delivery of legal process system presents an acceptance document to the recipient 110 and asks the recipient 110 to execute the acceptance document. The acceptance document is a form acknowledging and accepting the service of the electronic documents upon the recipient, such as the acknowledgment of receipt 510 illustrated and described in additional detail above with reference to FIG. 5. In various embodiments, asking the recipient 110 to execute an acceptance document acknowledging and accepting the service of the electronic documents 140 comprises requesting a digital signature or other indication of the recipient's intent to sign the acceptance document. The recipient 110 can sign the acceptance document to provide proof of service (or waiver of service) and complete the service of process. An example acknowledgment presentation page 500 is illustrated and described in additional detail above with reference to FIG. 5.

In block 695, if the recipient executes the acceptance document, the digital delivery of legal process system saves the executed acceptance document as evidence of the recipient's acceptance (or waiver) of service of process. In some embodiments, the system is further configured to generate a proof of service confirming service details, such that the acceptance document and the proof of service can be filed with a court to show service of the electronic documents 140 upon the recipient 110.

The operational routine 600 ends in ending block 699. In various embodiments, if the user or recipient 110 does not complete the process of digital delivery of legal process, the system logs any confirmed data to direct an attempt of physical service of process to deliver physical documents 140 corresponding to the electronic documents 140 to the recipient 110.

Alternative implementations of the operational routine 600 can perform routines having processes in a different order, and some processes or blocks can be deleted, moved, added, subdivided, combined, and/or modified to provide alternative or sub combinations. For example, in some embodiments, the disclosed systems and methods verify a user's identity as the service recipient 110 before or in parallel with receiving a matter identification code or retrieval code 125 to direct the user to the secure legal document portal for the recipient's matter. Each of these processes or blocks can be implemented in a variety of different ways. While some processes or blocks may be shown as being performed in series, they may instead be performed or implemented in parallel, or can be performed at different times.

Additional features may be implemented in the operational routine 600. By way of example, an additional block may include obtaining additional or secondary verification of the identity of the recipient. For example, such additional verification may include obtaining an image or an electronic record of an ID card of the recipient, and comparing information of the ID card to a likeness of the recipient or to information that the recipient is able to provide. As another example, the user interface may include providing an audio and/or video connection to a computing device of the recipient in connection with providing access to the electronic documents. Features that may be implemented in the operational routine 600 may also be implemented in other embodiments in accordance with the disclosed technology.

The inventors expressly contemplate that the various options described herein for individual methods and systems are not intended to be so limited except where incompatible. The features and benefits of individual methods herein may also be used in combination with systems and other methods described herein even though not specifically indicated elsewhere. Similarly, the features and benefits of individual systems herein may also be used in combination with methods and other systems described herein even though not specifically indicated elsewhere.

Figure 7:
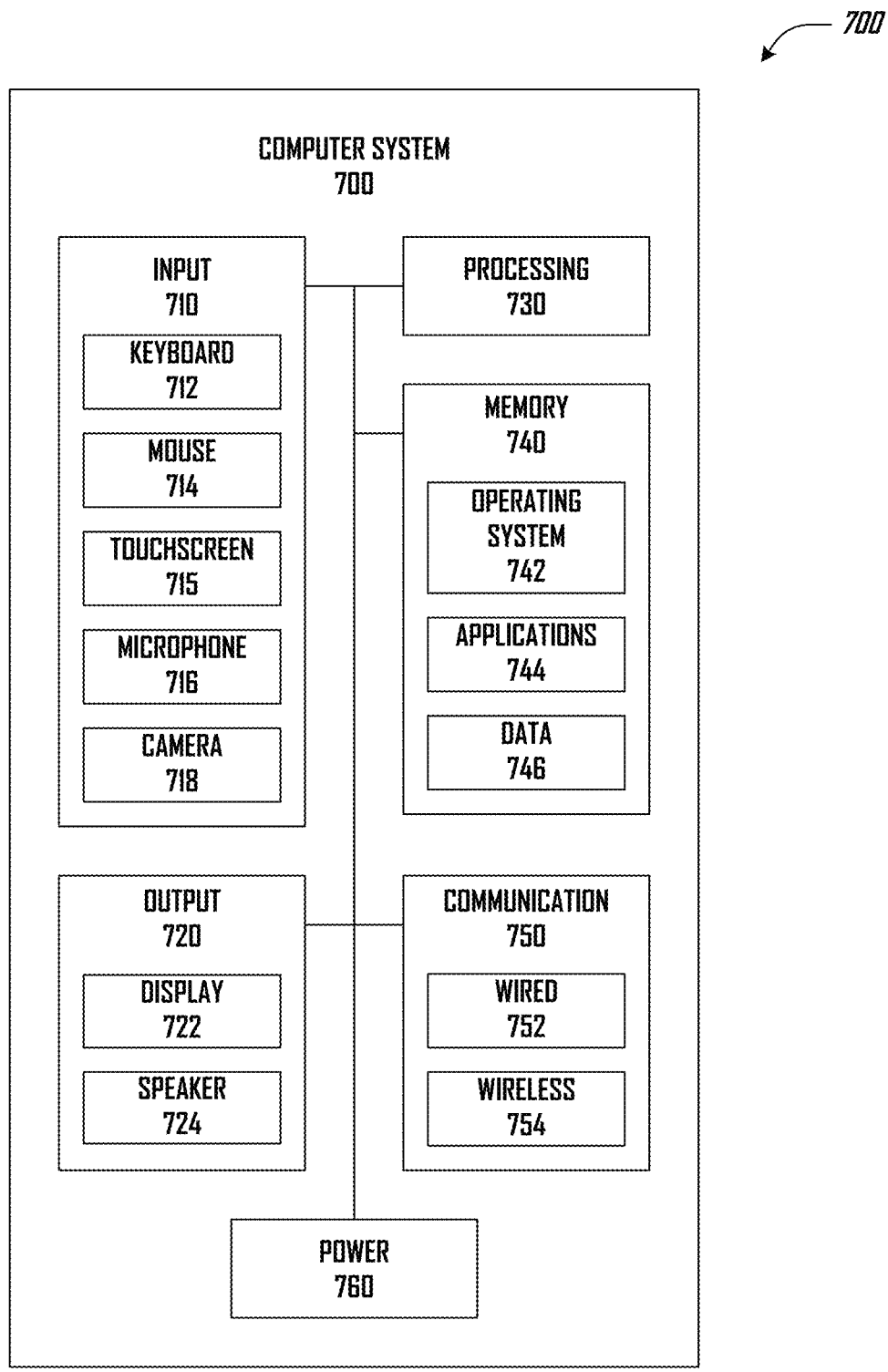
FIG. 7 is a block diagram showing some of the components typically incorporated in computing systems on which the present technology can be implemented.

FIG. 7 is a block diagram showing some of the components typically incorporated in computing systems and other devices in connection with which the present technology can be implemented. The computer system 700 may include a subset or superset of the components described herein. In the illustrated embodiment, the computer system 700 includes a processing component 730 that controls operation of the computer system 700 in accordance with computer-readable instructions stored in memory 740. The processing component 730 may be any logic processing unit, such as one or more central processing units (CPUs), graphics processing units (GPUs), digital signal processors (DSPs), field-programmable gate arrays (FPGAs), application-specific integrated circuits (ASICs), etc. The processing component 730 may be a single processing unit or multiple processing units in an electronic device or distributed across multiple devices. Aspects of the present technology can be embodied in a special purpose computing device or data processor that is specifically programmed, configured, or constructed to perform one or more of the computer-executable instructions explained in detail herein.

Aspects of the present technology can also be practiced in distributed computing environments in which functions or modules are performed by remote processing devices that are linked through a communications network, such as a local area network (LAN), wide area network (WAN), or the Internet. In a distributed computing environment, modules can be located in both local and remote memory storage devices. In various embodiments, the computer system 700 may comprise one or more physical and/or logical devices that collectively provide the functionalities described herein. In some embodiments, the computer system 700 may comprise one or more replicated and/or distributed physical or logical devices. In some embodiments, the computer system 700 may comprise one or more computing resources provisioned from a "cloud computing" provider, for example, Amazon® Elastic Compute Cloud ("Amazon EC2®"), Amazon Web Services® ("AWS®"), and/or Amazon Simple Storage Service™ ("Amazon S3™"), provided by Amazon.com, Inc. of Seattle, Washington; Google Cloud Platform™ and/or Google Cloud Storage™, provided by Google Inc. of Mountain View, California; Windows Azure®, provided by Microsoft Corporation of Redmond, Washington; and the like.

The processing component 730 is connected to memory 740, which can include a combination of temporary and/or permanent storage, and both read-only memory (ROM) and writable memory (e.g., random access memory (RAM), processor registers, and on-chip cache memories), writable non-volatile memory such as flash memory or other solid-state memory or solid-state disks (SSDs), hard drives, removable media, magnetically or optically readable discs and/or tapes, nanotechnology memory, synthetic biological memory, and so forth. A memory is not a propagating signal divorced from underlying hardware; thus, a memory and a computer-readable storage medium do not refer to a transitory propagating signal per se. The memory 740 includes data storage that contains programs, software, and information, such as an operating system 742, application programs 744, and data 746. Computer system 700 operating systems 742 can include, for example, Windows®, Linux®

Android™, iOS®, Chrome OS™, middleware, and/or an embedded real-time operating system. The application programs 744 and data 746 can include software and data-including data structures, database records, etc.—configured to control computer system 700 components, process information (to, e.g., optimize vibrations for a body), communicate and exchange data and information with remote computers and other devices, etc.

The computer system 700 can include input components 710 that receive input from user interactions and provide input to the processor 730, typically mediated by a hardware controller that interprets the raw signals received from the input device and communicates the information to the processor 730 using a known communication protocol. Examples of an input component 710 include a keyboard 712 (with physical or virtual keys), a pointing device (such as a mouse 714, joystick, dial, or eye tracking device), a touchscreen 715 that detects contact events when it is touched by a user, a microphone 716 that receives audio input, and a camera 718 for still photograph and/or video capture. The computer system 700 can also include various other input components 710 such as GPS or other location determination sensors, motion sensors, wearable input devices with accelerometers (e.g., wearable glove-type input devices), biometric sensors (e.g., a fingerprint sensor), light sensors (e.g., an infrared sensor), card readers (e.g., a magnetic stripe reader or a memory card reader), and so on.

The processor 730 can also be connected to one or more various output components 720, e.g., directly or via a hardware controller. The output devices can include a display 722 on which text and graphics are displayed. The display 722 can be, for example, an LCD, LED, or OLED display screen (such as a desktop computer screen, handheld device screen, or television screen), an e-ink display, a projected display (such as a heads-up display device), and/or a display integrated with a touchscreen 715 that serves as an input device as well as an output device that provides graphical and textual visual feedback to the user. The output devices can also include a speaker 724 for playing audio signals, haptic feedback devices for tactile output such as vibration, etc. In some implementations, the speaker 724 and the microphone 716 are implemented by a combined audio input-output device.

In the illustrated embodiment, the computer system 700 further includes one or more communication components 750. The communication components can include, for example, a wired network connection 752 (e.g., one or more of an Ethernet port, cable modem, Thunderbolt cable, Fire Wire cable, Lightning connector, universal serial bus (USB) port, etc.) and/or a wireless transceiver 754 (e.g., one or more of a Wi-Fi transceiver; Bluetooth transceiver; near-field communication (NFC) device; wireless modem or cellular radio utilizing GSM, CDMA, 3G, 4G, and/or 5G technologies; etc.). The communication components 750 are suitable for communication between the computer system 700 and other local and/or remote computing devices, directly via a wired or wireless peer-to-peer connection and/or indirectly via a communication link and networking hardware, such as switches, routers, repeaters, electrical cables and optical fibers, light emitters and receivers, radio transmitters and receivers, and the like (which can include the Internet, a public or private intranet, a local or extended Wi-Fi network, cell towers, the plain old telephone system (POTS), etc.). The computer system 700 further includes power 760, which can include a stored energy system such as a capacitor or battery; an external power supply such as a direct current (DC) voltage source; or a connection to an alternating current (AC) conductor for operation of the various electrical components associated with the computer system 700.

Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, or the like. While computer systems configured as described above are typically used to support the operation of the technology, one of ordinary skill in the art will appreciate that the technology may be implemented using devices of various types and configurations, and having various components. Alternative implementations of the systems disclosed herein can employ systems having blocks arranged in different ways; and some blocks can be deleted, moved, added, subdivided, combined, and/or modified to provide alternative or sub combinations. Each of these blocks can be implemented in a variety of different ways. However, it is not necessary to show such infrastructure and implementation details or variations to describe an illustrative embodiment.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of an online secure legal document portal, in other embodiments various other interfaces and/or form factors may be used. In addition, interactions and output of the disclosed systems may be provided locally and/or performed or displayed remotely. The spirit and scope of this application is intended to cover any adaptations or variations of the embodiments discussed herein.

Thus, although the subject matter has been described in language specific to structural features and/or methodological acts, it is also to be understood that the subject matter defined in the appended claims is not necessarily limited to the specific features or acts described. Rather, the specific features and acts are disclosed as example forms of implementing the claims. This application is intended to cover any adaptations or variations of the embodiments discussed herein.

We claim:

1. A secure document portal system that provides a recipient electronic delivery of one or more electronic documents, the system comprising one or more computing devices including one or more processors and memories containing program code for execution by the one or more processors, the one or more computing devices configured to:

receive personally identifiable information about the recipient, and metadata about the one or more electronic documents;

generate a retrieval code, wherein the retrieval code is specific to the recipient and/or specific to the one or more electronic documents;

cause the retrieval code to be embedded or encoded in a machine readable code and displayed on a delivery notice page or a device separate from the one or more electronic documents for delivery without proof of service to the recipient; and at a later time:
receive, from a user, input including the retrieval code;
verify, in response to receiving the input, that the user is the recipient;
present an acceptance document acknowledging and accepting or waiving service of the one or more electronic documents upon the recipient;
ask the recipient to execute the acceptance document;
when the recipient executes the acceptance document, save the executed acceptance document as evidence of acceptance or waiver of service of process by the recipient; and
provide the recipient one of electronic delivery, email delivery, or both electronic delivery and email delivery of the one or more electronic documents to the recipient.

2. The secure document portal system of claim 1, wherein the one or more computing devices are further configured to store the one or more electronic documents to be provided to the recipient.

3. The secure document portal system of claim 1, wherein the retrieval code is displayed in alphanumeric form and/or embedded or encoded in a URL.

4. The secure document portal system of claim 3, wherein receiving user input including the retrieval code includes
receiving, over a communication network, input of the alphanumeric retrieval code entered by the user, or
receiving a request directed to a URL in which the retrieval code is embedded or encoded.

5. The secure document portal system of claim 1, wherein causing the retrieval code to be displayed on the delivery notice page or device includes
printing the retrieval code on a paper configured to be delivered to or left at an address associated with the recipient, or
sending an electronic message including the retrieval code to an email address, instant messaging address, or text message number or address associated with the recipient.

6. The secure document portal system of claim 1, wherein receiving a user input including the retrieval code further comprises
logging an interaction indicating, for an address where the delivery notice page or device displaying the retrieval code was delivered, that the address is viable to be associated with the recipient.

7. The secure document portal system of claim 1, wherein, in response to receiving the user input, verifying that the user is the recipient includes causing display of a page specific to the recipient.

8. The secure document portal system of claim 1, wherein, in response to receiving the user input, verifying that the user is the recipient includes confirming that the user can prove their identity with information that corresponds to the personally identifiable information about the recipient.

9. The secure document portal system of claim 1, wherein, in response to receiving the input, verifying that the user is the recipient further comprises recording a digital signature of the user and/or obtaining an email address of the user.

10. The secure document portal system of claim 1, wherein if the verification is not successful, the system does not provide the user the personally identifiable information about the recipient or the one or more electronic documents.

11. The secure document portal system of claim 1, wherein if the system determines the user is not the recipient for whom the one or more electronic documents are intended, the system allows the user to submit an address or other contact or location information of the recipient for whom the electronic documents are intended.

12. The secure document portal system of claim 1, wherein if the verification is successful, the system records a confirmation, for an address where the page or device displaying the retrieval code was delivered, that the address is associated with or a residence of the recipient.

13. The secure document portal system of claim 1, wherein if the verification is successful, the system allows the user to provide an updated address of the recipient.

14. The secure document portal system of claim 13, wherein the one or more computing devices are further configured to determine whether the updated address of the recipient is in a venue or jurisdiction associated with the one or more electronic documents, and if the updated address of the recipient is not in the venue or jurisdiction associated with the one or more electronic documents, the system cancels delivery of the one or more electronic documents.

15. The secure document portal system of claim 1, further comprising offering electronic delivery of the one or more electronic documents to the recipient and/or sending the one or more electronic documents to an email address of the recipient.

16. The secure document portal system of claim 1, further comprising sending physical copies of the one or more electronic documents to a physical address of the recipient.

17. The secure document portal system of claim 1, wherein the system allows the recipient to schedule a preferred time for physical delivery of physical documents corresponding to the one or more electronic documents.

18. The secure document portal system of claim 1, wherein the one or more computing devices are further configured to log some or all confirmed data to direct an attempt of physical service of process to deliver physical documents corresponding to the one or more electronic documents to the recipient.

19. A non-transitory machine-readable medium having stored thereon instructions allowing a secure document portal to provide a recipient delivery of electronic documents, that when executed by one or more processors in one or more computing devices, configure the computing devices to:
receive personally identifiable information about the recipient, and metadata about one or more electronic documents;
generate a retrieval code, wherein the retrieval code is specific to the recipient and/or specific to the one or more electronic documents;
cause the retrieval code to be embedded or encoded in machine-readable code and displayed on a delivery notice page or device separate from the one or more electronic documents for delivery without proof of service to the recipient; and
at a later time:
receive, from a user, input including the retrieval code;
verify, in response to receiving the input, that the user is the recipient;
present an acceptance document acknowledging and accepting or waiving service of the one or more electronic documents upon the recipient;
ask the recipient to execute the acceptance document;
when the recipient executes the acceptance document, save the executed acceptance document as evidence of acceptance or waiver of service of process by the recipient; and provide the recipient one of electronic delivery, email delivery, or both electronic delivery and email delivery of the one or more electronic documents, wherein the metadata allows the one or more computing devices to retrieve the one or more electronic documents to provide the recipient the one or more electronic documents.

20. A method for a secure document portal to provide a recipient delivery of electronic documents, comprising providing machine-readable instructions executable by a computing system to:

receive personally identifiable information about the recipient, and metadata about one or more electronic documents;

generate a retrieval code, wherein the retrieval code is specific to the recipient and/or specific to the one or more electronic documents;

cause the retrieval code to be embedded or encoded machine-readable code and displayed on a delivery notice page or device separate from the one or more electronic documents for delivery without proof of service to the recipient; and at a later time:

receive, from a user, input including the retrieval code;

verify, in response to receiving the input, that the user is the recipient; and present an acceptance document acknowledging and accepting or waiving service of the one or more electronic documents upon the recipient;

ask the recipient to execute the acceptance document;

when the recipient executes the acceptance document, save the executed acceptance document as evidence of acceptance or waiver of service of process by the recipient; and provide the recipient, where email is not valid service, electronic delivery of the one or more electronic documents to the recipient, wherein the metadata allows the one or more computing devices to retrieve the one or more electronic documents to provide the recipient the one or more electronic documents.

\* \* \* \* \*